United States Patent
Neeman et al.

(10) Patent No.: US 12,217,405 B2
(45) Date of Patent: Feb. 4, 2025

(54) SYSTEM, METHOD AND COMPUTER PROGRAM PRODUCT FOR DIFFERENTIATING IMAGES COMPRISING ORIGINAL SCANS OF DOCUMENTS, FROM IMAGES OF DOCUMENTS THAT ARE NOT ORIGINAL SCANS

(71) Applicant: AU10TIX LTD., Hod Hasharon (IL)

(72) Inventors: Benjamin Neeman, Raanana (IL); Yael Moscovitz, Mevaseret Zion (IL); Sergey Markin, Herzeliya (IL); Evgeny Ostrovsky, Petah Tikva (IL)

(73) Assignee: AU10TIX LTD., Hod Hasharon (IL)

( * ) Notice: Subject to any disclaimer, the term of this patent is extended or adjusted under 35 U.S.C. 154(b) by 35 days.

(21) Appl. No.: 17/291,035

(22) PCT Filed: Oct. 31, 2019

(86) PCT No.: PCT/IL2019/051182
§ 371 (c)(1),
(2) Date: May 4, 2021

(87) PCT Pub. No.: WO2020/089907
PCT Pub. Date: May 7, 2020

(65) Prior Publication Data
US 2021/0374933 A1 Dec. 2, 2021

(30) Foreign Application Priority Data
Nov. 4, 2018 (IL) .......................................... 262773

(51) Int. Cl.
*G06T 7/00* (2017.01)
*G06T 7/40* (2017.01)

(52) U.S. Cl.
CPC .............. *G06T 7/0002* (2013.01); *G06T 7/40* (2013.01); *G06T 2207/10008* (2013.01); *G06T 2207/20056* (2013.01); *G06T 2207/30176* (2013.01)

(58) Field of Classification Search
CPC . G06T 2207/10008; G06T 2207/20056; G06T 2207/30176; G06T 7/0002;
(Continued)

(56) References Cited

U.S. PATENT DOCUMENTS 8,831,361 B2    9/2014  Pintsov
10,043,071 B1   8/2018  Wu
(Continued)

FOREIGN PATENT DOCUMENTS

WO    2013/014667 A2    1/2013
WO    2016/139653 A2    9/2016

OTHER PUBLICATIONS

Wisniewski, Mary, "How ID Scanning Could Boost Mobile Account Opening," American Banker, Mar. 24, 2015, <http://www.americanbanker.com/news/bank-technology/how-id-scanning-could-boost-mobile-account- opening-1073425-1.html>.
(Continued)

*Primary Examiner* — Zhiyu Lu
(74) *Attorney, Agent, or Firm* — Oliff PLC

(57) ABSTRACT

A method for processing images generated by unsupervised end-users, the method comprising determining whether or not at least one digital image of a document was generated by scanning an original document, including using a processor for applying a resolution analysis test to a textured region of interest; and sending at least one output indication of the determining operation.

15 Claims, 7 Drawing Sheets

(58) Field of Classification Search
CPC .. G06T 7/40; H04N 1/00801; H04N 1/00838; H04N 1/00843; H04N 1/00848; H04N 1/40062
See application file for complete search history.

(56) References Cited

U.S. PATENT DOCUMENTS

| | | | |
|---|---|---|---|
| 2005/0111027 A1* | 5/2005 | Cordery | G06T 1/0042 358/1.14 |
| 2005/0114668 A1* | 5/2005 | Haas | H04N 1/32208 713/176 |
| 2009/0067724 A1* | 3/2009 | Hirohata | G03G 21/046 382/190 |
| 2009/0154778 A1 | 6/2009 | Lei et al. | |
| 2010/0067691 A1* | 3/2010 | Lin | H04L 9/3247 380/55 |
| 2010/0245034 A1 | 9/2010 | D'Oliveiro et al. | |
| 2010/0263034 A1 | 10/2010 | Banchelin | |
| 2010/0329577 A1 | 12/2010 | Kitai | |
| 2012/0226600 A1* | 9/2012 | Dolev | G06V 10/7515 382/137 |
| 2012/0229872 A1 | 9/2012 | Dolev | |
| 2012/0230577 A1 | 9/2012 | Calman et al. | |
| 2012/0263343 A1* | 10/2012 | Simske | G06V 20/80 382/100 |
| 2013/0243266 A1 | 9/2013 | Lazzouni | |
| 2013/0250366 A1* | 9/2013 | Kinoshita | G06K 15/1892 358/3.28 |
| 2013/0305059 A1 | 11/2013 | Gormley et al. | |
| 2013/0311788 A1 | 11/2013 | Faher et al. | |
| 2014/0003717 A1 | 1/2014 | Brito et al. | |
| 2014/0052636 A1 | 2/2014 | Mattes | |
| 2014/0230039 A1 | 8/2014 | Prakash et al. | |
| 2015/0007867 A1 | 1/2015 | Tokioka et al. | |
| 2018/0284672 A1* | 10/2018 | Saeda | H04N 1/32122 |

OTHER PUBLICATIONS

"Spectral Density," Wikipedia, Jul. 24, 2018 [Retrieved Feb. 24, 2020], <https://en.wikipedia.org/w/index.php?title=Spectral_density&oldid=851825921>.

"Bicubic Interpolation," Wikipedia, Oct. 10, 2017 [Retrieved Feb. 24, 2020], <https://en.wikipedia.org/w/index.php?title=Bicubic_interpolation&oldid=804689773>.

Farid, H. "Detecting Digital Forgeries Using Bispectral Analysis". Perceptual Science Group, Jan. 1, 1999, XP055499185.

Berenguel, A. et al. "Banknote conterfeit detection through background texture printing analysis". 2016 12th IAPR Workshop on Document Analysis Systems (DAS). IEEE, 2016.

* cited by examiner

Fig. 1

Operation 210 : Web service (aka server side) prompts end user to provide identifying document.
↓
Operation 220: End user sends Image into web service; Operation 220 may include operations 410 – 440 of Fig. 3.
↓
Operation 230: Optionally, web service determines whether the image is an identity document. If not, web service typically informs end-user accordingly and typically returns to operation 210 at least once before terminating session.
If yes, continue.
↓
Operation 250: Web service identifies category of identity document
↓
Operation 260: If the image quality is low, the result is set to "Not Relevant", end. Otherwise, continue.
↓
Operation 270: Perform at least one (typically identity-document type-specific) forgery test typically including (for at least some documents) spectral-analysis based texture forgery test of Fig. 2.
↓
Operation280: Web server handles document as per results of forgery tests e.g. provides web services to end user for remainder of on-line session if all forgery tests indicate document end-user provided in operation 30 to be authentic

Fig. 2

Operation 310: If type of identity document identified in operation 250 is known to have a background texture and a large-enough background-only rectangle, retrieve (from repository) location L of background-only rectangle or use image processing to identify background-only rectangle.

↓

Operation 320: texture pattern region is cropped from the original document image sent in by user, at the location L.

↓

Operation 330: Texture pattern region may be suitably aligned.

↓

Operation 340: Compute ratio (RHO) over the cropped, aligned texture pattern region.

↓

Operation 350: A texture forgery/authentic decision is made by comparison of ρ to at least one threshold.

↓

Operation 360: If decision = indecisive, send document to human operator who is prompted to provide a manual texture forgery/authentic decision.

↓

Operation 370: If decision = authentic and/or indecisive, compute a sharp vs. blurred measurement/index in a nearest-text region which is adjacent to the cropped region and which contains text. If this index is lower than a threshold, typically downgrade authentic to indecisive and/or indecisive to forgery.

Fig. 3

Operation 410: mobile application performs initial crop-alignment and scaling (or compression) and sends resulting initially cropped, initially aligned and scaled (or compressed) image to server SDK.

Operation 420: server SDK (or mobile SDK) performs classification e.g. to determine which known type of document, the original image represents.

Operation 430: server SDK defines a target region aka ROI, aka "test related part" aka "test-related document portion". This operation may rely on the classification operation 420.

Operation 440: mobile application, aka client, applies, to the original image, an inverse mapping and refined alignment-crop (crop and alignment), based on the parameters received from the server SDK in operation 430.

Operation 450: test is performed on fine resolution data. either the mobile app transfers fine resolution data, representing either the entire image or only the ROI therewithin, post- refined crop-and-alignment, to the server SDK which does the test, or, e.g. for use-cases with very restrictive communication bandwidth between the mobile app and the SDK server, the test is done at the mobile app which then sends test results, rather than fine resolution image data itself, to the server SDK.

Fig. 4:

Operation 1000: For each of at least one e.g. plural known classes of textured documents having at least one periodic (or repeating) pattern, determine range/s for output parameter/s which is/are characteristically yielded when an image of the original document's region of interest is subjected to a test e.g. spectral analysis, and is/are not characteristically yielded when the region of interest in an image of a copy of the document is not subjected to the test.

Operation 1010: Pre-store, for each of at least one e.g. plural known classes of textured documents having at least one periodic (or repeating) pattern, a periodic data profile for each such class including
(a) location or other identifying data, enabling a region of interest which includes periodic data in the document, to be localized within the document; and
(b) range/s for output parameter/s which is/are characteristically yielded when an image of the original document's region of interest is subjected to a test e.g. spectral analysis, and is/are not characteristically yielded when the region of interest in an image of a copy of the document is not subjected to the test, e.g. as determined in operation 1000.

Operation 1020: Receive a stream of digital images from plural remote end-users, and for at least one image I in the stream of digital images, perform original/copy differentiation e.g. as per the method of Fig. 5.

Fig. 5:

Operation 1100: Classify image I into a class, C, from among the plural known classes Operation 1110: Retrieve, from the periodic data profile of class C, location (e.g. x, y coordinate/s of at least one corner), size, or other identifying data, characterizing location of the region of interest in documents within class C.

Operation 1120: Use the data as retrieved to find image I's region of interest within image I, and crop image I's region of interest.

Operation 1130: Subject image I's (typically uncompressed) region of interest e.g. as cropped, to texture test suitable for testing periodic data e.g. (Fourier-transform based) spectral analysis, thereby to yield output parameter/s.

Operation 1140: Compare image I's output parameter/s to range/s for output parameter/s stored in class c's periodic data profile; if the output parameter/s fall within the range/s, determine that the digital image was obtained by scanning the original document, and, otherwise, determine that the digital image was obtained by scanning a copy of the original document.

Operation 1150: generate an output differentiating images of the original document from images of copies of the original document

Fig. 8

| # | File | Orig Size | Vis Size | Score1 | Score2 | Resol | IQ | Res1 | Res2 |
|---|------|-----------|----------|--------|--------|-------|-----|------|------|
| 1 | img0468 | 432 | 412 | 9.8125 | 4.4226 | High | High | Authentic | Authentic |
| 2 | img0470 | 440 | 412 | 2.2317 | 1.5079 | High | Low | Forged | Forged |
| 3 | img0478 | 556 | 412 | 1.545 | 0.876 | High | Low | Forged | Forged |
| 4 | img0480 | 580 | 412 | 12.4288 | 3.4209 | High | High | Authentic | Indecisive |
| 5 | img0482 | 856 | 412 | 29.1483 | 11.7138 | High | High | Authentic | Authentic |
| 6 | img0484 | 624 | 412 | 11.7798 | 4.9513 | High | High | Authentic | Authentic |
| 7 | img0486 | 292 | 412 | 1.2522 | 1.2522 | Low | High | Forged | Forged |
| 8 | img0488 | 164 | 412 | 0.7664 | 0.7664 | Low | High | Forged | Forged |
| 9 | img0450 | 884 | 412 | 6.859 | 2.9953 | High | High | Authentic | Indecisive |
| 10 | img0452 | 876 | 412 | 38.233 | 19.2189 | High | High | Authentic | Authentic |

SYSTEM, METHOD AND COMPUTER PROGRAM PRODUCT FOR DIFFERENTIATING IMAGES COMPRISING ORIGINAL SCANS OF DOCUMENTS, FROM IMAGES OF DOCUMENTS THAT ARE NOT ORIGINAL SCANS

REFERENCE TO CO-PENDING APPLICATIONS

The present application is the national phase entry of international patent application PCT/IL/2019/051182, filed on Oct. 31, 2019, which claims priority to Israeli patent application IL 262773, filed on Nov. 4, 2018, the entire disclosure of which is incorporated herein by reference.

FIELD OF THIS DISCLOSURE

The present invention relates generally to computerized systems, and more particularly to web services.

BACKGROUND FOR THIS DISCLOSURE

Conventional technology constituting background to certain embodiments of the present invention is described in the following publications inter alia:

Co-owned patent document PCT/IL2012/050265 published as WO 2013/014667 describes machine-learning techniques.

Co-owned "gateway" patent document PCT/IL2016/050112 published as WO 2016/139653 on Sep. 9, 2016, also incorporated herein by reference, determines whether an image is an identity document.

Mobile banking technology is used today, which prompts end-users applying for an account to photograph their driver's licenses, passports, identity cards, and other identifying documents using their smartphone camera, then extracts data from the license imaged by the end-user and uses the extracted data to auto-fill portions of the end-user's application to (say) open a new account. This may be appreciated from the following link: http://www.americanbanker.com/news/bank-technology/how-id-scanning-could-boost-mobile-account-opening-1073425-1.html 3-layer authentication on ID images smartphone camera-imaged by end-users, including logical e.g. data integrity, forensic and meta authentication checks, is performed within a few seconds per image, by AU10TIX BOS used by Fortune 500 organizations and other regulated financial services. BOS (Back Office Service) is an online/mobile ID document image authentication and onboarding platform.

The Fourier transform (FT) decomposes a function of time (signal) into the frequencies that make it up.

According to Wikipedia, the power spectrum of a time series describes the distribution of power into frequency components composing that signal. In Fourier analysis, any physical signal can be decomposed into discrete frequencies, or a spectrum of frequencies over a continuous range. The statistical average of a certain signal or sort of signal (including noise), as analyzed in terms of its frequency content, is called its spectrum. When the energy of the signal is concentrated around a finite time interval, especially if its total energy is finite, one may compute the energy spectral density. More commonly used is the power spectral density (aka power spectrum).

Bicubic_interpolation is known and is described e.g. in a Wikipedia entry. https://en.wikidpedia.org/wiki/Bicubic_interpolation Methods for image processing so as to identify elements of or extract information from an identity document, are described inter alia in:

US20090154778A1 2007 Dec. 12 2009 Jun. 18 3M Identification and verification of an unknown document according to an Eigen image process;

US20100245034A1 2007 Jun. 28 2010 Sep. 30 Iris Corporation Berhad, Method of reading MRZ using SAM for electronic chip based travel document or identification document;

US20100263034A1 2007 Dec. 18 2010 Oct. 14 Xavier Banchelin, Method for authorising a communication with a portable electronic device, such as access to a memory zone, corresponding electronic device and system;

US20100329577A1 2009 Jun. 24 2010 Dec. 30 Fuji Xerox Co., Ltd., Image processing device;

US20120229872A1 2009 Nov. 10 2012 Sep. 13 Au10Tix Limited, Apparatus and methods for computerized authentication of electronic documents;

US20120230577A1*2011 Mar. 8 2012 Sep. 13 Bank Of America Corporation, Recognizing financial document images;

US20130243266A1 2012 Mar. 3 16 2013 Sep. 19 L-1 Secure Credentialing, Inc. iPassport Apparatus and Method;

US20130305059A1 2012 Apr. 10 2013 Nov. 14 Sita Information Networking Computing Ireland Limited, Airport Security Check System and Method Therefor;

US20130311788A1 2010 Dec. 31 2013 Nov. 21 Mourad Faher System providing an improved skimming resistance for an electronic identity document;

US20140003717A1*2012 Jul. 2 2014 Jan. 2 Palo Alto Research Center Incorporated, System and method for forms classification by line-art alignment;

US20140052636A1*2012 Aug. 15 2014 Feb. 20 Jumio Inc., Image Processing For Credit Card Validation;

US20140230039A1 2013 Feb. 8 2014 Aug. 14 Gyan Prakash, Barcode authentication for resource requests;

U.S. Pat. No. 8,831,361B2*2012 Mar. 9 2014 Sep. 9 Ancora Software Inc., Method and system for commercial document image classification; and US20150078671A1 2013 Sep. 19 2015 Mar. 19 IDChecker, Inc., Automated document recognition, identification, and data extraction.

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Certain embodiments seek to provide a system or method for differentiating images which comprise original scans of documents from images of documents that are not original scans, e.g. for web or other use-cases in which a remote user is instructed to scan an original document and send, to a server, the resulting digital file, wherein the remote user may or may not comply with this instruction, hence may send a file resulting from a scan of an original document, and may send a file which does not result from a scan of an original document.

Certain embodiments of the present invention seek to provide circuitry typically comprising at least one processor in communication with at least one memory, with instructions stored in such memory executed by the processor to provide functionalities which are described herein in detail. Any functionality described herein may be firmware-implemented or processor-implemented as appropriate.

It is appreciated that any reference herein to, or recitation of, an operation being performed is, e.g. if the operation is performed at least partly in software, intended to include both an embodiment where the operation is performed in its entirety by a server A, and also to include any type of "outsourcing" or "cloud" embodiments in which the operation, or portions thereof, is or are performed by a remote processor P (or several such), which may be deployed off-shore or "on a cloud", and an output of the operation is then communicated to, e.g. over a suitable computer network, and used by, server A. Analogously, the remote processor P may not, itself, perform all of the operations, and, instead, the remote processor P itself may receive output/s of portion/s of the operation from yet another processor/s P', may be deployed off-shore relative to P, or "on a cloud", and so forth.

The present invention typically includes at least the following embodiments:

Embodiment 1. A method for processing images generated by unsupervised end-users, the method comprising:
 determining whether or not at least one digital image of a document was generated by scanning an original document, including using a processor for applying a resolution analysis test to a textured region of interest e.g. in the digital image; and
 sending at least one output indication of the determining operation.

Embodiment 2. A method according to any of the preceding embodiments wherein the textured region of interest appears at a known location for each document belonging to a known class of documents.

Embodiment 3. A method according to any of the preceding embodiments wherein the test yields results which are compared to at least one threshold value separating test results yielded by images of documents generated by scanning an original document, from test results yielded by images of documents generated by scanning a copy of the original document.

Embodiment 4. A method according to any of the preceding embodiments and also comprising pre-testing to establish the at least one threshold value, including applying the resolution analysis test, for each of a first plurality of images each known to have been generated from an original instance of the class of documents, and for each of a second plurality of images each known to have been generated from a copy of an original instance of the class of documents, thereby to accumulate results of the test for each of the first and second pluralities of images, identifying at least one value V separating at least one range of results yielded by the first plurality of images from at least one range of results yielded by the second plurality of images, and setting the at least one threshold value to V.

Embodiment 5. A method according to any of the preceding embodiments wherein the image is captured by a client camera device and wherein the resolution analysis test is performed by a remote server on a non-compressed image of, to conserve bandwidth, only the textured region of interest, provided by the client camera device to the remote server.

Embodiment 6. A method according to any of the preceding embodiments wherein the determining is performed for plural images of plural documents belonging to different known classes of documents for which the textured region of interest appears at respective different locations, known to a server, within the document, and wherein the client camera device first sends the image at a first resolution to the server which determines which class c from among the classes the image belongs to, then the server commands the client camera device to send a region appearing at a location within the image, which is known to the server to include the known location of the textured region of interest for class c, and then the client camera device sends only the region and not the entire image, at a second resolution higher than the first resolution, to the server which applies the resolution analysis test.

Embodiment 7. A method according to any of the preceding embodiments wherein the resolution analysis test comprises a Fourier-transform based spectrum analysis test.

Embodiment 8. A method according to any of the preceding embodiments wherein the determining includes determining whether or not the digital image was obtained by scanning a copy of the original document.

Embodiment 9. A computer program product, comprising a non-transitory tangible computer readable medium having computer readable program code embodied therein, the computer readable program code adapted to be executed to implement a method for processing images generated by unsupervised end-users, the method comprising:
 determining whether or not at least one digital image of a document was generated by scanning an original document, including using a processor for applying a resolution analysis test to a textured region of interest e.g. in the digital image; and
 sending at least one output indication of the determining operation.

Embodiment 10. A system for processing images generated by unsupervised end-users, the system comprising:
 a processor configured for using a processor for applying a resolution analysis test to a textured region of interest e.g. in a digital image and, accordingly, determining whether or not the digital image was generated by scanning an original document; and
 an output device in data communication with the processor for sending at least one output indication of the determining operation.

Also provided, excluding signals, is a computer program comprising computer program code means for performing any of the methods shown and described herein when the program is run on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes, or a general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with all or any subset of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as flash drives, optical disks, CDROMs, DVDs, BluRays, magnetic-optical discs or other discs: RAMs, ROMs, EPROMs, EEPROMs, magnetic or optical or other cards, for storing, and keyboard or mouse for accepting. Modules shown and described herein may include any one or combination or plurality of: a server, a data processor, a memory/computer storage, a communication interface, a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. Use of nouns in singular form is not intended to be limiting; thus the term processor is intended to include a plurality of processing units which may be distributed or remote, the term server is intended to include plural typically interconnected modules running on plural respective servers, and so forth.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements all or any subset of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless stated otherwise, terms such as, "processing", "computing", "estimating", "selecting", "ranking", "grading", "calculating", "determining", "generating", "reassessing", "classifying", "generating", "producing", "stereomatching", "registering", "detecting", "associating", "superimposing", "obtaining", "providing", "accessing", "setting" or the like, refer to the action and/or processes of at least one computer/s or computing system/s, or processor/s or similar electronic computing device/s or circuitry, that manipulate and/or transform data which may be represented as physical, such as electronic, quantities e.g. within the computing system's registers and/or memories, and/or may be provided on-the-fly, into other data which may be similarly represented as physical quantities within the computing system's memories, registers or other such information storage, transmission or display devices or may be provided to external factors e.g. via a suitable data network. The term "computer" should be broadly construed to cover any kind of electronic device with data processing capabilities, including, by way of non-limiting example, personal computers, servers, embedded cores, computing systems, communication devices, processors (e.g. digital signal processor (DSP), microcontrollers, field programmable gate array (FPGA), application specific integrated circuit (ASIC), etc.) and other electronic computing devices. Any reference to a computer, controller or processor is intended to include one or more hardware devices e.g. chips, which may be co-located or remote from one another. Any controller or processor may for example comprise at least one CPU, DSP, FPGA or ASIC, suitably configured in accordance with the logic and functionalities described herein.

The present invention may be described, merely for clarity, in terms of terminology specific to, or references to, particular programming languages, operating systems, browsers, system versions, individual products, protocols and the like. It will be appreciated that this terminology or such reference/s is intended to convey general principles of operation clearly and briefly, by way of example, and is not intended to limit the scope of the invention solely to a particular programming language, operating system, browser, system version, or individual product or protocol. Nonetheless, the disclosure of the standard or other professional literature defining the programming language, operating system, browser, system version, or individual product or protocol in question, is incorporated by reference herein in its entirety.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings; in the block diagrams, arrows between modules may be implemented as APIs and any suitable technology may be used for interconnecting functional components or modules illustrated herein in a suitable sequence or order e.g. via a suitable API/interface. For example, state of the art tools may be employed, such as but not limited to Apache Thrift and Avro which provide remote call support. Or, a standard communication protocol may be employed, such as but not limited to HTTP or MQTT, and may be combined with a standard data format, such as but not limited to JSON or XML.

FIG. 1 is a simplified flowchart illustration of a method for interacting with a user prompted to image or scan a document e.g. identity document, according to certain embodiments.

FIG. 2 is a simplified flowchart illustration of a method according to certain embodiments which may, for example, be used to perform operation 270 of FIG. 1. The method of FIG. 2 may include spectral-analysis.

FIG. 3 is a data processing flow for an image preprocessing (image alignment and crop) method according to certain embodiments. operation 220 in FIG. 1 may include operations 410-440 in FIG. 3. Operation 450 may be performed as part of operation 270 of FIG. 1.

FIG. 4 is a simplified flowchart illustration of a method for original/copy differentiation, including preparatory operations.

FIG. 5 is a simplified flowchart illustration of a method for original/copy differentiation which may be performed, e.g. in conjunction with the method of FIG. 4, during an online session with a remote end-user supplying an originally scanned document or a copy of a document which is not originally scanned.

FIG. 8 is a table useful in understanding certain embodiments.

Figure 6:
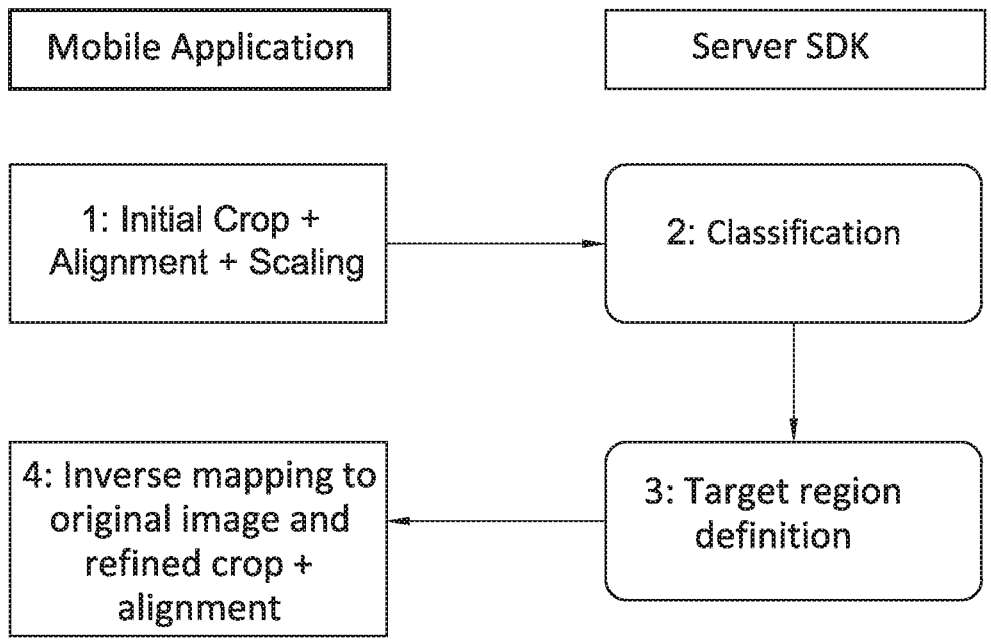
FIG. 6 is a general flow illustration which may serve as an alternative to the method of FIG. 3.

All or any subset of the operations of the methods of FIGS. 1-6 (aka flows a-f respectively) may be performed, in any suitable order e.g. as shown. The operations (all of, or any subset of) any of the FIGS. 1-6 may be combined with operations (all of, or any subset of) in any other of FIGS. 1-6.

Methods and systems included in the scope of the present invention may include some (e.g. any suitable subset) or all of the functional blocks shown in the specifically illustrated implementations by way of example, in any suitable order e.g. as shown.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Each functionality or method herein may be implemented in software (e.g. for execution on suitable processing hardware such as a microprocessor or digital signal processor), firmware, hardware (using any conventional hardware technology such as Integrated Circuit Technology) or any combination thereof.

Functionality or operations stipulated as being software-implemented may alternatively be wholly or fully implemented by an equivalent hardware or firmware module and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware in which case all or any subset of the variables, parameters, and computations described herein may be in hardware.

Any module or functionality described herein may comprise a suitably configured hardware component or circuitry. Alternatively or in addition, modules or functionality described herein may be performed by a general purpose computer, or more generally by a suitable microprocessor, configured in accordance with methods shown and described herein, or any suitable subset, in any suitable order, of the operations included in such methods, or in accordance with methods known in the art.

Any logical functionality described herein may be implemented as a real time application, if and as appropriate, and which may employ any suitable architectural option such as but not limited to FPGA, ASIC or DSP or any suitable combination thereof.

Any hardware component mentioned herein may in fact include either one or more hardware devices e.g. chips, which may be co-located or remote from one another.

Any method described herein is intended to include within the scope of the embodiments of the present invention also any software or computer program performing all or any subset of the method's operations, including a mobile application, platform or operating system e.g. as stored in a medium, as well as combining the computer program with a hardware device to perform all or any subset of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Reference is now made to FIG. 1 which is a simplified flowchart illustration of a method for interacting with a user prompted to image or scan a document e.g. identity document, according to certain embodiments. The method of FIG. 1 typically includes all or any subset of the following operations, suitably ordered e.g. as illustrated:

Operation 210: Web service (aka server side) prompts end user to provide identifying document.

Operation 220: End user sends Image into web service, typically by using her/his mobile phone camera to image an identity card/driving license/passport. Operation 220 may include operations 410-440 of FIG. 3. The term "mobile (communication) device", or phone, as used herein is intended to include but not be limited to any of the following: mobile telephone, smart phone, playstation, iPad, TV, remote desktop computer, game console, tablet, mobile e.g. laptop or other computer terminal, embedded remote unit.

Operation 230: Optionally, web service determines whether the image is an identity document e.g. using any of the teachings of co-owned "gateway" patent document PCT/IL2016/050112 published as WO 2016/139653 on Sep. 9, 2016.

If not, web service informs end-user accordingly and returns to operation 210 at least once before terminating session.

If yes, continue.

Operation 250: Web service identifies category of identity document (e.g. country; ID document type e.g. license, passport; version), using e.g. patent document PCT/IL2012/050265 published as WO 2013/014667 which describes machine-learning techniques or documents cited therewithin, the disclosures of which are all hereby incorporated by reference.

Operation 260: If the image quality is low, the result is set to "Not Relevant", end. Otherwise, continue.

Operation 270: Perform at least one (typically identity-document type-specific) forgery test including (for at least some documents) spectral-analysis based texture forgery test of FIG. 2.

Spectral-analysis, or resolution analysis, may be used as a forgery test or may be used to ensure that end-user imaged an original, rather than a copy.

Operation 280: Web server handles document as per results of forgery tests e.g. provides web services to end user for remainder of on-line session if all forgery tests indicate document end-user provided in operation 30 to be authentic; otherwise e.g. if spectral-analysis based texture forgery test of FIG. 2 indicates document end-user provided in operation 230 has a texture forgery, discontinue session with end-user. According to certain embodiments, the end-user's IP address may be added to a blacklist.

FIG. 2 is a simplified flowchart illustration of a method according to certain embodiments which may for example be used to perform operation 270 of FIG. 1. The method of FIG. 2 may include spectral-analysis and all or any subset of its operations may be used for resolution analysis. The method of FIG. 2 typically includes all or any subset of the following operations, suitably ordered e.g. as illustrated:

Operation 310: If type of identity document identified in operation 40 is known to have a background texture and a large-enough background-only rectangle, retrieve (from repository) location L of background-only rectangle or use image processing to identify background-only rectangle.

Operation 320: texture pattern region is cropped from the original document image sent in by user, at the location L.

Operation 330: The texture pattern region may be suitably aligned.

Operation 340: Compute ratio (RHO) over the cropped, aligned texture pattern region.

Operation 350: A texture forgery/authentic decision is made by comparison of p to at least one threshold.

Operation 360: If decision=indecisive, send document to human operator who is prompted to provide a manual texture forgery/authentic decision.

Operation 370: If decision=authentic and/or indecisive, compute a sharp vs. blurred measurement/index in a nearest-text region which is adjacent to the cropped region and which contains text. If this index is lower than a threshold, it is likely that the texture region is also too blurred, hence downgrade authentic to indecisive and/or indecisive to forgery.

The test may be regarded as Not Relevant.

Alternatively, operation 370 may be performed between operations 310 and 320. Operations 320 onward may be aborted e.g. if index indicates blurriness.

A Texture Forgery Test using Spectral Analysis is described below in detail.

A texture analysis method, using power spectral distribution analysis which may be applied to an identity document (typically having pixels e.g. CMYK pixels, where the pixels may be identified by spatial e.g. Cartesian coordinates) whose background texture is periodically patterned, e.g. in order to detect forgeries, is now described. All or any subset of the operations described below may be used for resolution analysis.

The spectral method is useful due to the existence of periodic (or repeating) patterns in the background textures of certain document types such as Israeli ID Versions 4, 5. Fortunately, a test region representative of the texture pattern is typically available which includes a rectangle e.g. square large enough for the spectral method, and generally free, or nearly free, of other irregular elements. The spectral method herein uses a standard Fourier transform to analyze the power distribution of the background texture's harmonic components in the frequency domain. The test region may for example include two periods of the background text pattern in each of the horizontal and vertical dimensions. If the resolution of the original image of the document is sufficiently large, the test region's two dimensions may each be hundreds of pixels long e.g. 500 or 800 or more pixels.

The power spectral density (PSD) is computed as a 2D Fourier transform of the ROI gray (intensity) image multiplied by the 2D Fourier transform's complex conjugate e.g. as per formula i:

$$\text{psd}=F^*\text{conj}(F); \text{ where } F(k,l)=\iint Y(x,y)e^{-i(kx+ly)}dx\,dy.$$

Example: For a visual standard of a document image sized to 1650×1130 pixels, the texture pattern template aka Source pattern may be 412×412 pixels in size; frequency ranges may be [−206:206]. In a typical PSD for this resolution, a well noticeable texture pattern results including four (say) compact zones which may be, say, near the (±95, ±95) frequencies with strong peaks. The respective harmonics may have a period about 4.33 pixels in each direction for the adopted Vis image resolution. The log (PSD) may be projected to the XZ plane. A simple or simplified type or representation of the texture, containing, say, the four main periodical components, then allows estimation of power dominancy in the close neighborhood of the texture components over the texture components' more distant harmonics.

According to certain embodiments, for the visual standard (say) of the document image sized to 1650×1130 (by way of example), the texture pattern template or test region has a size 412×412 (say). A typical PSD for this resolution and well noticeable texture pattern is depicted in FIGS. 3 and 4.

Four compact zones are seen, in the illustrated example, near the (±95, ±95) frequencies with strong peaks. The respective harmonics have a period about 4.33 pixels in each direction for the adopted Vis image resolution.

A type of texture, containing the (e.g. respective) four main periodical components, allows estimation of the power dominancy in the close neighborhood of the texture components over their more distant harmonics.

The method may include evaluating a local "dominancy" of the basic wave components e.g. by computing (e.g. as per formula ii:)

$$\rho = \left(\frac{1}{|S_1|}\int_{S_1} psd(\sigma)d\sigma\right) \Big/ \left(\frac{1}{|S_2 \setminus S_1|}\int_{S_2 \setminus S_1} psd(\sigma)d\sigma\right)$$

a ratio (RHO=numerator/denominator) between:
numerator: mean power in some close or small vicinity of certain points, aka basic component frequencies, in the frequency domain and
denominator: respective mean power in a wider environment or vicinity surrounding the above points or basic component frequencies in the frequency domain.

The bandwidths of S1 and S2 areas may be defined as: [−15, +15] and [−30, +55] respectively. s1 and s2 may respectively be the close and wider vicinities.

However, some additional high-frequency zone e.g. with bandwidth ≥25 is typically used to diminish impact of the noise and/or marginal artifacts.

A decision (aka "res" or "result") is then made, regarding whether or not the document is forged, by comparison of the ratio ρ to at least one and typically 2 thresholds e.g. as shown in formula iii:

$$res = \begin{cases} \text{Authentic,} & \rho \geq thresHi \\ \text{Indecisive,} & \rho \in [thresLo, thresHi) \\ \text{Forged,} & \text{otherwise} \end{cases}$$

If RHO is low, this is indicative of a weak or missing texture (no significant dominant harmonics in the expected frequency ranges) e.g. because image quality was insufficient, or because this is a forged document in which the background's texture was not reproduced or was improperly reproduced. Poor image quality may result from a blurred or noisy shot of the image and/or from poor JPEG compression.

The method may pretest for each document-type, which JPEG compression to use.

The low/high thresholds in formula ii, ThreshLo and ThreshHi respectively, may for example be equal to 2.5 and 4 respectively, or may be determined by suitable pre-testing.

Example: an ID document has a texture so fine as to be not observable to the human eye, yet the original resolution is large enough (note the cropped aligned image size 2222×1522 is greater than 1650×1130 in the illustrated example). The cropped and aligned image size is 2222×1522 pixels and the texture pattern crop side (e.g. length of one dimension of e.g. square region of interest) is equal to say 556 pixels.

According to some embodiments, alignment of an image includes aligning the four corners of an imaged documents, with the four corners of the image itself, and aligning the remaining pixels of the imaged document accordingly, such that the document covers the entire image and such that the imaged document corners coincide with the corners of the image.

According to some embodiments, alignment of an image includes aligning the four sides of the imaged documents, with the four sides of the image itself (the first and last rows and columns of pixels), and aligning the remaining pixels of the imaged document accordingly, such that the document covers the entire image, and such that the imaged document sides coincide with the first and last rows and columns of the image.

The method may check that the original resolution is large enough, and, if not large enough, the method may compensate accordingly e.g. prompt the end-user to image again and/or change the compression that is used.

Typically, image quality e.g. resolution, is tested in advance. If image quality is low, RHO is typically not computed: instead the result, "res" is set in advance to, say, "Not Relevant".

It is appreciated that resolution and sharpness of the input image may contribute to spectrum accuracy.

Example: 10 images of different size and quality were selected from a data repository and RHO was computed twice:
1) For texture pattern extracted from original or aligned image,
2) For texture pattern extracted from visual image (intermediate resizing of original image).

RHO for the above computations 1 and 2 (score 1 and score 2 respectively) was computed. The results are shown in FIG. 8 aka Table 1. As is evident, results (res1 for computation 1 above and res2 for computation 2 above) highly depend on:
a) the texture pattern resolution ("Reso1" column below); and on
b) whether or not an intermediate resizing was done (IQ column e.g.).

Specifically, using low and high score thresholds of 2.5 (Forged/Indecisive) and 4.0 (Authentic), if the resolution was low or IQ was low, res1 and res2 results were "forged". Note that two images (img0480 and img0450 in rows 4 and 9 respectively) could not be deemed authentic due to the resizing: Res1 was authentic, without resizing, but res2, with resizing, was indecisive.

Figure 7:
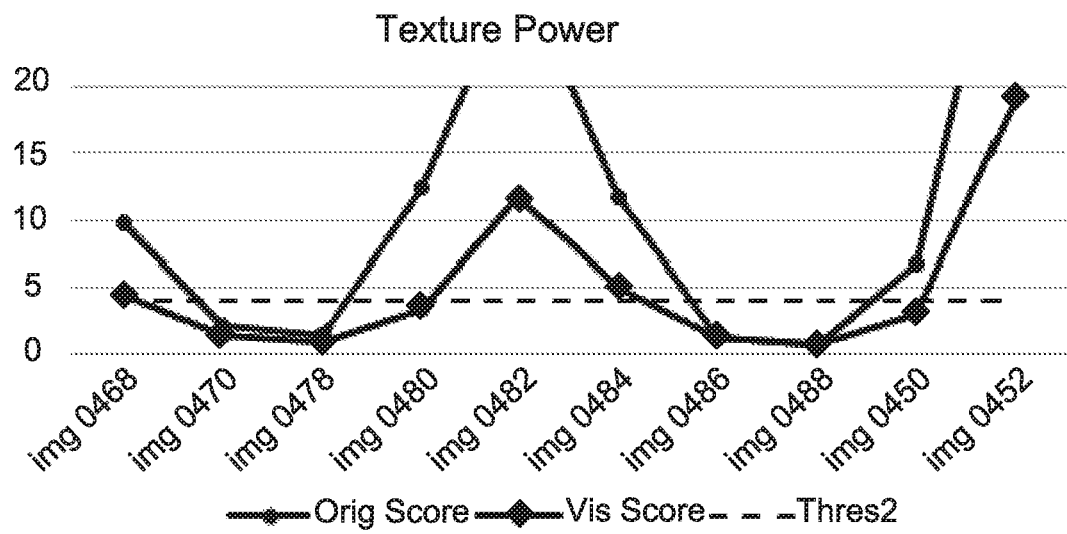
FIG. 7 is a graph illustration useful in understanding certain embodiments.

FIG. 7 shows score (RHO) plots for computations 1 and 2 in the above example. The dotted line shows the authenticity threshold (above threshold=authentic; below threshold=forged or indecisive). The upper score plot belongs to the original score (computation 1), whereas the lower score plot belongs to the visual score (computation 2).

In use cases in which resolution and sharpness of the input image are important e.g. as above, spectral analysis is typically performed on the original image or on an image resulting from minimal preprocessing of the original image, e.g. using minimal scaling needed for image alignment and crop.

Alignment may include all or any subset of the following transforms: perspective projection correction, rotation and geometrical distortion correction. Alignment should be made with high accuracy at the initial stage, in which the input image for the above texture test is generated. Minimal scaling may comprise local resizing, inevitably caused by non-affine transforms. The scaling factor is typically as close to 1 as possible, where a factor greater than 1 is preferable over a factor less than 1.

In this connection, suitable preprocessing, according to certain embodiments, is described below.

Furthermore, there is a texture sample resolution limitation caused by the relation between the maximum possible resolved frequency (e.g. Nyquist frequency) and bandwidth parameters used for estimation of the main texture harmonic power. Denoting:

$\sigma_0$—the main texture frequency,
$S_2^+$—the right leg of the wide band,
$S_{high}$—extra bandwidth,
The following then holds (formula iv):

$$\sigma_{max} = \sigma_0 + S_2^+ + S_{high} = 95 + 55 + 25 = 175 \leq f_{Ny},$$

which implies that the patch side (dimension of the region of interest) is advisedly at least 2×175=350 pixels.

Using template sizes, an approximate minimum size of the aligned and cropped original image may be estimated. For example, if the size of the template pattern is 412×412, the size of the Vis image is 1650×1130, which results in [1650, 1130]*350/412 [1400, 960] as the minimum image size in the input.

It is appreciated that forgery and image quality degradation may both result in images which are either visually the same, or are at least indiscernible using with the spectrum metrics considered herein. The spectrum based metrics themselves can be used as good IQ indices. So, to distinguish between forgery and image quality degradation, additional criteria may be used. One useful criterion may be a sharpness measurement taken on some near located object in the image, which contains text. If this sharpness measurement or index is low, one may assume that the texture region is also too blurred, and the test result is set as Not Relevant. Otherwise, document forgery may be considered with higher probability or deemed more probable e.g. by weighting.

Also, original images usually undergo compression in mobile cameras and/or the mobile application may resize the image. These factors may impact texture forgery testability. If it is technically impossible to keep the original image until the end of the processing (e.g. as per flow 3 aka FIG. 3 herein) and some early image compression is used, suitable technology workarounds may be used to preserve fine image details in the texture analysis region of interest e.g.:

to use an interpolation mode parameter no worse than BICUBIC.
to compute spectral characteristics on the client;
to send the original texture patch to the server.

If the full raw image sending to server is possible, this is one possible solution, although not necessary the theoretically best one.

Document Under-Cropping

At the preprocessing stage, the mobile application sometimes does too "safe" a crop, leaving large fields around the real document edges. Even if the resizing is done with very good quality, the size of the texture patch may fall under the acceptable minimum as determined e.g. by formula iv herein. The probable solutions, other than those already described herein, are:

to improve the edge detection algorithm and to find edges more accurately;
to do less resizing of the cropped image;
keep the original image after sending the first approximation to the server, then on receiving more precise results from the server, repeat the image preprocessing, all e.g. as described herein in flow 3 aka FIG. 3.

It is appreciated that some mobile apps e.g. the Au10tix mobile application, can do resizing.

According to certain embodiments, the system stores in computer storage, e.g. for each document type e.g. French driving license version 6, the location of a texture box. The box may be found for each type, in advance, automatically or by a human.

If RHO falls in between the two thresholds ThreshHi and ThreshLo, the output is "indecisive" in which case a suitable predetermined outcome occurs e.g., say, document is sent to a queue for presentation to a human operator.

According to certain embodiments, the method is configured:

a) To take the minimal bounding crop for the selected ROI using the Au10tix mobile application; and/or
b) To send (e.g. additionally) the gray channel of the bounding crop to the server, "as is".

Certain embodiments seek to provide methods for retrieval of high-resolution document fragments e.g. using a mobile application.

Image preprocessing (image alignment and crop) capable of preserving the resolution and sharpness of an original photo taken with mobile camera, or part of such a photo, may greatly facilitate subsequent tests of document authenticity. Such tests may include e.g. the texture forgery test of FIG. 2, which may be performed by a suitably configured mobile application or dedicated application. Conversely, inaccuracies of alignment and/or crop and/or strong downscaling accompanied with smoothing may result in loss of fine details which originally existed in the samples. This may occur for example if cropping of an image aka photo leaves large redundant areas, thus decreasing the effective resolution because less memory space is devoted to the interesting areas.

These procedures may be performed with quality sufficient both for successful document recognition and for performing the tests requiring a regular resolution.

FIG. 3 is a data processing flow for an image preprocessing (image alignment and crop) method according to certain embodiments. The method of FIG. 3 includes all or any subset of the following operations, suitably ordered e.g. as follows:

Operation 410: mobile application performs initial crop-alignment and scaling (or compression) and sends resulting initially cropped, initially aligned and scaled (or compressed) image to server SDK. However, the original image is kept in mobile application memory at least till after operation 440.

Operation 420: server SDK (or mobile SDK) performs classification e.g. to determine which known type of document, the original image represents. For example, perhaps this is an image of a credit card from financial institute x, or a passport version/series y from country y', or a cheque from bank z or a driving license, version (or series) w, from a country w'.

Operation 430: server SDK defines a target region aka ROI, aka "test related part" aka "test-related document portion". This operation may rely on the classification operation 420. For example, there may be a data repository for document of type x, do certain test/s such as but limited to certain spectrum analysis. And/or there may be a data repository indicating that for class y, the region of interest is at location z, since the ROI may be different for each document type (different ROI for French passport than for German driver's license e.g.), the "ROI" may be defined in memory using any suitable technique e.g. size plus coordinate of upper left (say) corner relative to upper left (say) document edge, location relative to known "anchors" (recognizable elements within the document), and so forth. The server SDK typically sends target region's parameters e.g. coordinates, and coordinates of the document edges, to the mobile application.

Operation 440: mobile application, aka client, applies, to the original image, an inverse mapping and refined alignment-crop (crop and alignment), based on the parameters received from the server SDK in operation 430.

Operation 450: test is performed on fine resolution data, either the mobile app transfers fine resolution data, representing either the entire image or only the ROI therewithin, post-refined crop-and-alignment, to the server SDK which does the test, or, e.g. for use-cases with very restrictive communication bandwidth between the mobile app and the SDK server, the test is done at the mobile app which then sends test results, rather than fine resolution image data itself, to the server SDK. If the mobile app does transfer fine resolution data to the server SDK, transfer typically occurs without downscaling. High-quality compression may be applied before transfer, if the high-quality compression does not reduce quality of the target test data.

This may be pretested and a data repository may be provided to store results of each such pre-test e.g. for each document type. These results may indicate whether or not it is safe to perform high-quality compression, and, if so, what type of compression, and which parameters to use.

According to certain embodiments, the method is operative for sending a first approximation to the server, then receiving more precise results from the server, then repeating image preprocessing.

According to certain embodiments, the mobile app has selective modes of operation, which may be selected for performing operation 450, depending on the technical parameters of the mobile device onto which the mobile app has been downloaded, and/or on communication bandwidth between mobile app and server, e.g.:

Unrestricted mode: entire document image after refined crop and alignment, is transferred to server without downscaling, possibly with compression;

Partial mode: region of interest only, after refined crop and alignment, is transferred to server without downscaling, possibly with compression;

Embedded mode: fine resolution data tested (e.g. using method of FIG. 2) in the client with subsequent sending of only the test results to the SDK server.

According to certain embodiments, the above flow (FIG. 3) is incorporated into the flow of FIG. 1, e.g. as follows: operation 220 in FIG. 1 may include operations 410-440 above. Operation 450 above may be performed as part of operation 270 of FIG. 1.

A particular use-case, according to certain embodiments, is to analyze a digital image of a document and determine, e.g. with acceptable accuracy, whether the digital image was obtained by scanning the original document, or whether the digital image was obtained by scanning a copy of the original document. A method which so analyzes and determines is termed herein a method for original/copy differentiation. Such methods may subject textured portions of the image (e.g. portions bearing a repeating pattern) to a test e.g. Fourier transform based, e.g. spectral analysis, which analyzes the texture's resolution or fine-ness, since an image generated from a copy of an original document, is typically smoother and/or has less high resolution, than an image generated from the original document itself. There is non-trivial variance even between results of such tests applied to different images generated (typically in non-uniform, unsupervised conditions e.g. illuminations, distances) from a single original image, and a fortiori between results of such tests applied to different images generated from three different original images all belonging to the same class (e.g. generated from three Israeli driving licenses, version 4, belonging to three Israeli drivers—Joe, Jim and George). However, it turns out that it is possible to cluster such results into a first cluster characteristic of images captured from an original, and a second cluster characteristic of images captured from a copy of the original. This is particularly the case since the test is usually applied to a textured background portion of the original image which is typically uniform over all instances of documents belonging to the same class e.g. the textured background portion of Joe's Israeli driving license, version 4, is extremely similar to the textured background portion of Jim's Israeli driving license, version 4.

Note: the term "copy of an original" used herein may also include a copy of a copy (aka $2^{nd}$ generation copy), a copy of a copy of a copy (aka $3^{nd}$ generation copy), and so forth, since differences between an image of an original and an image of a "first generation copy" thereof typically exist a fortiori between the image of the original and an image of an "n-th generation copy" thereof where n>1.

This use-case is valuable since it turns out that, for various reasons, an unsupervised end-user tasked e.g. by applicable regulations of a country, financial institution etc. with scanning an original e.g. identification document into a server e.g. of a web service, often decides to dispense with the regulations and scan a copy of the document, instead. For example, unsupervised end-users may need to travel or pay to obtain an original document, whereas the end-user does have a copy of the original document in her or his physical possession. In such situations, many unsupervised end-users will prefer to scan the copy, rather than making the effort of obtaining, or gaining physical access to, the original.

According to certain embodiments, the method is performed by a server and digital image/s are accessible to client/s of the server e.g. to a mobile app residing on a cellphone whose camera has generated the digital image, if the server is the server-end of the mobile app. Typically, the server and its client/s communicate via an API to cooperatively perform a method for original/copy differentiation e.g. as described herein in flows 4, 5. It is appreciated that details or entire operations within these flows may if desired be combined with any of the flows 1-3; conversely details or entire operations within flows 1-3 may, if desired, be combined with flow 4 and/or flow 5 (aka FIGS. 4, 5 respectively).

Flow 4 aka FIG. 4 typically includes all or any subset of the following operations, suitably ordered e.g. as illustrated:

Operation 1000: For each of at least one e.g. plural known classes of textured documents having at least one periodic (or repeating) pattern, determine range/s for output parameter/s which is/are characteristically yielded when an image of the original document's region of interest is subjected to a test e.g. spectral analysis, and is/are not characteristically yielded when the region of interest in an image of a copy of the document is not subjected to the test. For example, a first set of images, generated by imaging original documents belonging to the class in question, may be subjected to spectral analysis, and a second set of images, generated by imaging copies of original documents belonging to the class in question, may also be subjected to spectral analysis. Then, selections from the first and second sets of images may be used as a training set, and other selections from the first and second sets of images may be used as a test set, and machine learning may be used to train a classifier to distinguish the first and second sets, including determining the desired ranges.

Operation 1010: Pre-store, for each of at least one e.g. plural known classes of textured documents having at least one periodic (or repeating) pattern, a periodic data profile for each such class including (a) location or other identifying data, enabling a region of interest which includes periodic data in the document, to be localized within the document; and (b) range/s for output parameter/s which is/are characteristically yielded when an image of the original document's region of interest is subjected to a test e.g. spectral analysis, and is/are not characteristically yielded when the region of interest in an image of a copy of the document is not subjected to the test, e.g. as determined in operation 1000.

It is appreciated that any suitable method may be employed for generating location or other identifying data as above. For example, the region of interest's size in pixel may be stored, as well as its location relative to the document's edges, which may be found using any suitable image processing technique, or relative to known "anchors" whose locations are known, for given classes of textured documents. Such anchors may include any recognizable (using conventional image processing) element in documents of a given class whose location, for that class, has been learned, say, a birthdate field, a name field, a name-of-issuing-country field, a name-of-issuing-financial-institution, names of known fields such as "mother's name", "address", special regions e.g. MRZ, bar-code, photo known to exist in a certain class of documents, and so on. Example methods for image processing so as to identify elements of an identity document, are described in prior art documents listed in the Background section.

Operation 1020: Receive a stream of digital images from plural remote end-users, and for at least one image I in the stream of digital images, perform original/copy differentiation e.g. as per the method of FIG. 5.

Flow 5 aka FIG. 5 typically includes all or any subset of the following operations, suitably ordered e.g. as illustrated:

Operation 1100: Classify image I into a class, C, from among the plural known classes e.g. as described in co-owned patent document PCT/IL2012/050265 published as WO 2013/014667 which describes machine-learning techniques or documents cited therewithin, the disclosures of which are all hereby incorporated by reference.

For example, a given image I may be classified as an Israeli ID card, version 4, or perhaps as a French driving license, version 8, or a Venezuela passport, version 6.

Typically operation 1100 is performed at the server end, since it turns out that even if image I is generated by one of the server's clients, and is then compressed before sending the image to the server (e.g. using 90% JPEG-compression or any other compression technology and percent of compression conventionally used e.g. by mobile devices before sending images to conserve bandwidth), classification is successful and is unimpeded by the fact that the image being processed for classification, is compressed.

Operation 1110: Retrieve, from the periodic data profile of class C, location (e.g. x, y coordinate/s of at least one corner), size, or other identifying data, characterizing location of the region of interest in documents within class C. This operation may be performed at the server end e.g. if the classes' periodic data profiles are stored in a repository accessible to the server, but not to the clients.

Operation 1120: Use the data as retrieved to find image I's region of interest within image I, and crop image I's region of interest. According to some embodiments, the client transfers the image I to the server which performs operation 1120. According to other embodiments, the server commands the client to perform operation 1120 (typically on the pre-compressed image) and to send only the region of interest, typically uncompressed, to the server. This is feasible since the region of interest as described herein is typically much smaller than the entire image; for example, the entire uncompressed image may be, in order of magnitude, 5 Mbyte in size, whereas the region of interest (which may, say, include 2 repetitions of the pattern along each of its 2, horizontal and vertical, dimensions) may be, in order of magnitude, only 100-200 kb in size.

Operation 1130: Subject image I's (typically uncompressed) region of interest e.g. as cropped, to texture test suitable for testing periodic data e.g. (Fourier-transform based) spectral analysis, thereby to yield output parameter/s. This may be done at the server or client end.

Operation 1140: Compare image I's output parameter/s to range/s for output parameter/s stored in class c's periodic data profile; if the output parameter/s fall within the range/s, determine that the digital image was obtained by scanning the original document, and, otherwise, determine that the digital image was obtained by scanning a copy of the original document. For example, ratio RHO described herein may be used as output parameter and threshold/s to which RHO is compared may be used to define endpoint/s of the range/s described hereinabove.

Operation 1150: generate an output differentiating images of the original document from images of copies of the original document e.g. by issuing a warning if image I was generated by imaging a copy of the original document, but not if image I was generated by imaging an original document. The warning may be issued to the end-user, in order to urge her or him to (gain physical access to and) scan the original document rather than a copy thereof and/or may be issued to regulation-enforcement authorities and/or may be issued to decision-makers who may, say, decide between various courses of action open to them, given the information that a particular document is scanned from a copy, not from the original.

It is appreciated that the methods and systems shown herein are useful in conjunction with products such as but not limited to:

online/mobile ID document image authentication and onboarding platforms e.g. BOS (Back Office Service)—AU10TIX.

branch/POS physical ID authentication and onboarding platform e.g. FDI (Front-end Document Identification)—AU10TIX.

mobile SDK for the optimization of ID document images by customers and for augment face capture and selfie-to-document biometric authentication.

Possible use-cases, other than web-services, include, say, detection of counterfeit money (bills) or physical access control.

It is appreciated that terminology such as "mandatory", "required", "need" and "must" refer to implementation choices made within the context of a particular implementation or application described herewithin for clarity and are not intended to be limiting since in an alternative implementation, the same elements might be defined as not mandatory and not required or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally including at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for downloading to clients, which are executed at the client side, the server side serving only as a storehouse. Any or all functionalities e.g. software functionalities shown and described herein may be deployed in a cloud environment. Clients e.g. mobile communication devices, such as smartphones, may be operatively associated with, but external to, the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Any "if-then" logic described herein is intended to include embodiments in which a processor is programmed to repeatedly determine whether condition x, which is sometimes true and sometimes false, is currently true or false and to perform y each time x is determined to be true, thereby to yield a processor which performs y at least once, typically on an "if and only if" basis e.g. triggered only by determinations that x is true and never by determinations that x is false.

Features of the present invention, including operations, which are described in the context of separate embodiments may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment or in a certain order, may be provided separately or in any suitable sub-combination, including with features known in the art (particularly although not limited to those described in the Background section or in publications mentioned therein) or in a different order. "e.g." is used herein in the sense of a specific example which is not intended to be limiting. Each method may comprise all or any subset of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. A method for processing images generated by unsupervised end-users, the method comprising:
    determining whether at least one digital image of a document was generated by scanning an original document or was not generated by scanning the original document, including using a processor for applying a resolution analysis test to a textured region of interest; and
    sending at least one output indication of the determining operation,
    wherein said image is captured by a client camera device, and wherein the resolution analysis test is performed, by a server deployed remotely vis-à-vis the client camera device, on an image I of the region of interest which is sent to the server and which, to conserve bandwidth, includes less than all of the original document
    wherein the determining is performed for plural images of plural documents belonging to different known classes of documents for which the region of interest appears at respective different locations, known to the server, within the document, and
    wherein the client camera device first sends the image at a first resolution to the server
    which determines which class c from among said classes the image belongs to,
    then the server commands the client camera device to send a region appearing at a location within the image, which is known to the server to include the known location of the region of interest for class c,
    and then the client camera device sends only the region and not the entire image, at a second resolution higher than said first resolution, to the server which applies said test.

2. The method according to claim 1 wherein the textured region of interest appears at a known location for each document belonging to a known class of documents.

3. The method according to claim 1, wherein the resolution analysis test yields results which are compared to at least one threshold value separating test results yielded by images of documents generated by scanning the original document, from test results yielded by images of documents generated by scanning a copy of the original document.

4. The method according to claim 3, further comprising pre-testing to establish said at least one threshold value, including applying the resolution analysis test, for each of a first plurality of images each known to have been generated from an original instance of the class of documents, and for each of a second plurality of images each known to have been generated from a copy of the original instance of the class of documents, thereby to accumulate results of the resolution analysis test for each of the first and second pluralities of images, identifying at least one value V separating at least one range of results yielded by the first plurality of images from at least one range of results yielded by the second plurality of images, and setting said at least one threshold value to V.

5. The method according to claim 1, wherein said textured region of interest, to which the resolution analysis test is applied, comprises a repeating pattern.

6. The method according to claim 1, wherein said textured region of interest comprises a repeating pattern which is subjected to the resolution analysis test which analyzes the texture's resolution, since an image generated from a copy of the original document, is typically smoother and/or has less high resolution, than an image generated from the original document itself.

7. The method according to claim 1, wherein the resolution analysis test comprises a Fourier-transform based spectrum analysis test.

8. The method according to claim 1, wherein said determining includes determining whether or not the digital image was obtained by scanning a copy of the original document.

9. A computer program product, comprising a non-transitory tangible computer readable medium having computer readable program code embodied therein, said computer readable program code adapted to be executed to implement a method for processing images generated by unsupervised end-users, the method comprising:
    determining whether at least one digital image of a document was generated by scanning an original document or said at least one digital image of the document was generated by scanning a copy, including using a processor for applying a resolution analysis test to a textured region of interest in said digital image; and
    sending at least one output indication of the determining operation,
    wherein said image is captured by a client camera device, and wherein the resolution analysis test is performed, by a server deployed remotely vis-à-vis the client camera device, on an image I of the region of interest which is sent to the server and which, to conserve bandwidth, includes less than all of the original document
    wherein the determining is performed for plural images of plural documents belonging to different known classes of documents for which the region of interest appears at respective different locations, known to the server, within the document, and
    wherein the client camera device first sends the image at a first resolution to the server
    which determines which class c from among said classes the image belongs to,
    then the server commands the client camera device to send a region appearing at a location within the image, which is known to the server to include the known location of the region of interest for class c,
    and then the client camera device sends only the region and not the entire image, at a second resolution higher than said first resolution, to the server which applies said test.

10. A system for processing images generated by unsupervised end-users, the system comprising:
    a processor configured for applying a resolution analysis test to a textured region of interest in a digital image and, accordingly, determining whether said digital image was generated by scanning an original document or said digital image was not generated by scanning the original document; and an output device in data communication with said processor for sending at least one output indication of the determining operation, wherein said image is captured by a client camera device, and wherein the resolution analysis test is performed, by a server deployed remotely vis-à-vis the client camera device, on an image I of the region of interest which is sent to the server and which, to conserve bandwidth, includes less than all of the original document wherein the determining is performed for plural images of plural documents belonging to different known classes of documents for which the region of interest appears at respective different locations, known to the server, within the document, and wherein the client camera device first sends the image at a first resolution to the server which determines which class c from among said classes the image belongs to, then the server commands the client camera device to send a region appearing at a location within the image, which is known to the server to include the known location of the region of interest for class c, and then the client camera device sends only the region and not the entire image, at a second resolution higher than said first resolution, to the server which applies said test.

11. The method according to claim 1, wherein the output indication comprises information indicating that the document was scanned from a copy, not from the original.

12. The method according to claim 1, wherein the textured region of interest where the resolution analysis test is applied comprises a background portion of the document.

13. The system according to claim 10, wherein the textured region of interest where the resolution analysis test is applied comprises a background portion of the document.

14. The method according to claim 3, wherein the resolution analysis test comprises a Fourier-transform based spectrum analysis test.

15. The method according to claim 1 wherein the image I is provided by the client camera device to the remote server.

* * * * *